United States Patent [19]
Ribeiro

[11] 3,791,236
[45] Feb. 12, 1974

[54] BRIDGE FOR POWER TRANSMISSION FROM A CENTRAL POINT TO TWO LATERAL POINTS

[75] Inventor: José Luis Whitaker Ribeiro, Sao Paulo, Brazil

[73] Assignee: Engesa-Engenheiros Especializados S.A., Sao Paulo, Brazil

[22] Filed: Jan. 26, 1973

[21] Appl. No.: 326,821

Related U.S. Application Data

[63] Continuation of Ser. No. 115,608, Feb. 16, 1971, abandoned.

[52] U.S. Cl. .............................................. 74/710.5
[51] Int. Cl. .............................................. F16h 1/44
[58] Field of Search .................................. 74/710.5

[56] References Cited
UNITED STATES PATENTS

| | | | |
|---|---|---|---|
| 1,446,484 | 2/1923 | Ross | 74/710.5 |
| 1,451,406 | 4/1923 | Ross | 74/710.5 |
| 2,228,581 | 1/1941 | Olen | 74/711 UX |
| 2,245,595 | 6/1941 | Knox | 74/710.5 |
| 2,280,741 | 4/1942 | Bolster et al. | 74/710 UX |
| 2,874,790 | 2/1959 | Hennessey | 74/710.5 X |

*Primary Examiner*—Arthur T. McKeon
*Attorney, Agent, or Firm*—McGlew and Tuttle

[57] ABSTRACT

Bridge for power transmission from a central point to two lateral points, a transmission for a heavy duty vehicle, including a differential two shaft means driven by the differential, a pair of wheel supports and gear trains connecting the shaft means to the wheel supports; a blocking mechanism, with tubular axle shaft and at least one gear capable of rotating on the central shaft, and clutch means to connect said gear to the central shaft.

6 Claims, 2 Drawing Figures

BRIDGE FOR POWER TRANSMISSION FROM A CENTRAL POINT TO TWO LATERAL POINTS

This is a continuation, of application Ser. No. 115,608, now abandoned, filed Feb. 16, 1971.

This invention relates to heavy duty vehicles and is concerned with power transmissions therefor.

The invention is particularly concerned with power transmissions for vehicles having four driven rear wheels, or sets of driven wheels.

According to the invention there is provided a transmission for a heavy duty vehicle comprising a differential two shaft means driven by the differential, a pair of wheel supports at or near the free ends of each of the shaft means, and gear trains connecting the shaft means to the wheel supports to drive the latter.

In this way, two rear wheels or sets of wheels on either side of the vehicle can be driven from a single differential and with only one axle.

The axle means preferably comprises a shaft connected to the differential and being surrounded by a tubular shaft to which it is connected at or near its free end, the tubular shaft being attached, preferably integrally to a gear with which the gear trains mesh to be driven by the axle means. The gear trains are preferably contained within gear boxes which preferably carry the wheel supports. Preferably there is provided differential blocking means to overide the operation of the differential so that the wheels on each side of the vehicle rotate at the same speed.

For an undestanding of the principles of the invention, reference will be made to the following description of a typical embodiment thereof as illustrated in the accompanying drawing.

DESCRIPTION OF THE PREFERRED EMBODIMENT

Figure 1:
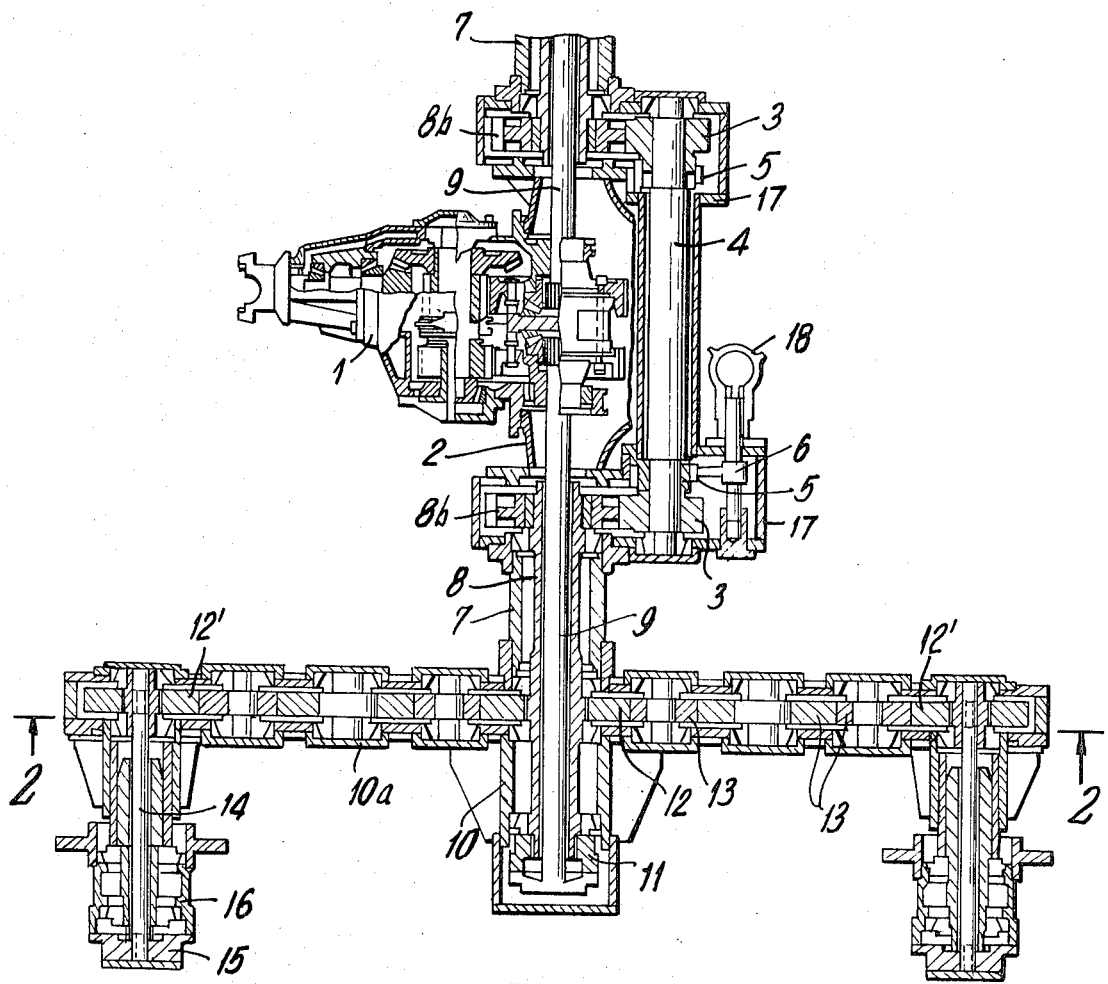
FIG. 1 is a horizontal sectional view through a transmission embodying the invention.
Figure 2:
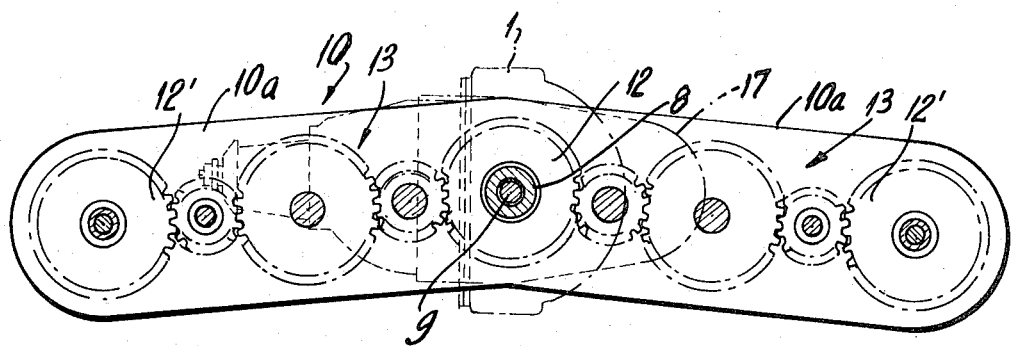
FIG. 2 is a vertical section taken on the line 2—2 of FIG. 1.

Referring now to the drawing there is shown diagrammatically a differential gear unit 1 contained within a housing 2. This differential housing 2 may be the same as a conventional housing or the original housing as supplied in a vehicle but with parts machined away so that the blocking mechanism 3,4,5 and 6 (to be described later) may be attached to the differential.

Two tubular housings 7 extend from the differential housing 2 and surround respectively axle shafts 9 which are driven by the differential unit 1, which are located co-axially within the housings 7, and which project from the outer ends of the housings 7. A tubular shaft 8 closely surrounds each axle shaft 9 and is connected to its outer end by means of a collar 11.

The tubular shaft 8 has a gear 8a formed on it near its outer end. A second gear 8b is splined to the shaft 8 near its inner end.

The gear 8a is a drive gear. Two gears 12 mesh with each drive gear 8a. These gears 12 are respectively the first gears in two gear trains 13 which drive, through the mechanism to be described, two wheel supports 16 (only one shown). The final gear 12' of each gear train 13 meshes with a gear 14' of a second axle 14. The second axle 14 is connected to the wheel support 16 through a splined connector 15.

The outer end of the axle shaft 9 is contained within a housing 10. This housing 10 has arms 10a which contain the gear trains 13 and which serve to carry the wheel supports 16. The housing 10 is rotatable about the axis of the shaft 9 so that the gear trains 13 and the wheel supports 16 can rotate about the shaft axis so that wheels (not shown) carried by the wheel supports 16 can accomodate considerable variations in the surface of the terrain over which the vehicle embodying the transmission is passing. It will be appreciated that the housing 10 can rotate through 360° but in practice stops are provided to limit the angle through which the housing can rotate.

The blocking mechanism comprise a pair of gears 3 which mesh with the gears 8b on the tubular shafts 8 respectively. These gears 3 are rotatable carried on the ends of a shaft 4 which is arranged parallel to the axle shafts 9. Coupling sleeves 5 are provided to connect the gears 3 to the shaft 4. One of these sleeves 5 forms in effect a clutch means. It is movable by a lever or yoke member 6 from a operative position in which it connects the associated gear 3 to the shaft 4 to an inoperative position in which the gear 3 is disconnected from the shaft 4 and is free to rotate thereon. The blocking mechanism is contained within blocking boxes 17 into a part of which a lever 18 or the like projects. This lever 18 is actuable by an operating device which may be mechanically, hydraulically, electrically or vacuum operated and which is controlled by means within the cabin of the vehicle and easily accessible to the driver. The lever 18 controls the operation of the lever or yoke member 6 and thus the position of the movable sleeve 5.

It will be seen that when the movable sleeve 5 is in its inoperative position, the gears 3 may rotate relative to one another and the differential operates normally. When, however, the movable sleeve 5 is in its operative position, the gears 3 rotate together thus joining the hollow shafts 8 and causing them to rotate together. In this way the differential operation is blocked or overridden.

In operation, with the blocking mechanism inoperative, drive from the differential is transmitted via the shaft 9, the hollow shaft 8 and the gear trains 13 through to the wheel supports 16 on each side of the differential 1. The wheels carried by the supports 16 on each side of the differential rotate at the same speed but, of course, due to the effect of the differential, the wheels on the other side of the differential may rotate at different speeds, e.g., when turning a corner. When the blocking mechanism is operative on the other hand, all the wheels rotate at the same speed, as the differential operation will be over-come.

It is of interest to stress the singular manner with which two grave problems are resolved:

a. Axle shaft 9, which is normally unifory in its diameter, is an original part of the vehicle, and was not designed to received all the torque transmitted to the differential. Consequently direct blocking could not have been effected on it.

b. A state of triple tension on the axle shaft would have resulted if the bridge had been "hung" directly on it. Obviously, the original axle shaft could not have been used. And in the evet of a new shaft being designed, its dimensions and the weight of the metal would normally be too large. The solution adopted is the simultaneous solution to those two problems:

a. Each axle shaft 9 only transmits at most half the torque transmitted to the differential, for the other half coming through the blocking mechanism is passed direct on to tubular axle shaft 8.

b. The state of triple tensions acts on the tubular axle shaft 8, inasmuch as this supports all the flexion and normal power and also receives torque through axle shaft 9 and from the blocking mechanism.

Another great advantage of the invention is the fact that, as mentioned above, the two housings (one on either side of the chassis) can tilt under enormous angles, this movement being interrupted by a stop attached to the chassis.

A vehicle possessing this property can obviously overcome enormous obstacles while the chassis remains practically stable. A vehicle fitted with this arrangement is consequently suitable for travelling over uneven terrain.

Having now in detail described and ascertained our said invention and the manner in which the same is to be performed.

We declare that what we claim is:

1. A transmission for a heavy duty vehicle comprising, in combination, a differential; two shaft means extending in opposite directions coaxially from said differential and driven by said differential; a respective elongated gear housing rockably mounted, adjacent its midpoint, on each shaft means adjacent the free end of the shaft means; a respective pair of wheel supports mounted on each gear housing adjacent the respective outer ends of the gear housing for rotation about axes parallel to and spaced from the associated shaft means; and respective gear trains connecting each shaft means to the associated pair of wheel supports to drive the wheel supports; each shaft means comprising a shaft connected to the differential and surrounded by a tubular shaft to which it is connected adjacent its free end, each tubular shaft being attached to a gear with which the associated gear trains mesh to be driven by the associated shaft means; said first-mentioned shafts constituting axle shafts driven by said differential and each driving the associated tubular shaft.

2. A transmission, as claimed in claim 1, comprising differential blocking means operable to interconnect said first-mentioned shafts to lock said first-mentioned shafts against relative rotation to override the operation of said differential.

3. A transmission, as claimed in claim 1, wherein each tubular shaft, the gear attached thereto, the respective gear trains and the associated wheel supports constitute a unit operatively mountable on a standard transmission including said differential and said two first-mentioned shafts extending in opposite directions coaxially from said differential and driven by said differential; each tubular shaft being telescopable over a respective first-mentioned shaft of the standard transmission; and coupling means operable to connect the outer end of each tubular shaft to the outer end of the associated first-mentioned shaft of the standard transmission.

4. A transmission for a heavy duty vehicle comprising, in combination, a differential; two shaft means extending in opposite directions coaxially from said differential and driven by said differential; a respective pair of wheel supports adjacent the free end of each shaft means; respective gear trains connecting each shaft means to the associated wheel supports to drive the latter; each shaft means comprising a shaft connected to the differential and surrounded by a tubular shaft to which it is connected adjacent its free end, each tubular shaft being attached to a gear with which the associated gear trains mesh to be driven by the associated shaft means; differential blocking means operable to override the operation of said differential; said first-mentioned shafts constituting axle shafts; said blocking mechanism including a central shaft extending parallel to said axle shafts, two further gears carried by said central shaft, and means operatively connecting each further gear in driving relation with a respective tubular shaft; at least one of said further gears being rotatable on said central shaft; and clutch means selectively operable to connect said one further gear to said central shaft for rotation of said two further gears as a unit to cause the two tubular shafts to rotate as a unit.

5. A transmission, as claimed in claim 4, in which said clutch means includes a remotely controlled operating yoke.

6. A transmission, as claimed in claim 4, in which said means operatively connecting each further gear to a respective tubular shaft comprises respective gears on the inner ends of said tubular shafts each meshing with a respective further gear.

* * * * *